United States Patent
Toyohara et al.

(10) Patent No.: US 8,818,159 B2
(45) Date of Patent: Aug. 26, 2014

(54) FIBER MOUNT DEVICE, OPTICAL MODULE USING SAME, AND OPTICAL MODULE MANUFACTURING METHOD

(71) Applicant: Fujikura Ltd., Tokyo (JP)

(72) Inventors: Nozomu Toyohara, Sakura (JP); Akira Sakamoto, Sakura (JP); Yohei Kasai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/969,716

(22) Filed: Aug. 19, 2013

(65) Prior Publication Data

US 2013/0336625 A1   Dec. 19, 2013

Related U.S. Application Data

(63) Continuation of application No. PCT/JP2012/050244, filed on Jan. 10, 2012.

(30) Foreign Application Priority Data

Feb. 24, 2011   (JP) ................. 2011-037926

(51) Int. Cl.
*G02B 6/00* (2006.01)

(52) U.S. Cl.
USPC .................. 385/137; 219/121.66; 385/88

(58) Field of Classification Search
CPC .. G02B 6/3648; G02B 6/3616; G02B 6/3608; G02B 6/3632; G02B 6/4249
USPC .............................. 385/137, 88–92
See application file for complete search history.

(56) References Cited

U.S. PATENT DOCUMENTS

| 5,307,434 A | 4/1994 | Blonder et al. |
| 6,164,837 A | 12/2000 | Haake et al. |
| 6,758,610 B2 * | 7/2004 | Ziari et al. ................. 385/92 |
| 7,512,306 B2 * | 3/2009 | Duesterberg et al. ......... 385/137 |
| 2006/0056788 A1 | 3/2006 | Williamson |
| 2009/0041072 A1 * | 2/2009 | Oguro ................. 372/29.021 |
| 2011/0317735 A1 | 12/2011 | Miyokawa |

FOREIGN PATENT DOCUMENTS

| JP | 1-319713 A | 12/1989 |
| JP | 6-214268 A | 8/1994 |
| JP | 2002-534710 A | 10/2002 |
| JP | 2006-509254 A | 3/2006 |
| WO | 2010/110068 A1 | 9/2010 |
| WO | 2011/122540 A1 | 10/2011 |

OTHER PUBLICATIONS

International Search Report dated Feb. 7, 2012, issued in corresponding application No. PCT/JP2012/050244.

* cited by examiner

*Primary Examiner* — Ellen Kim
(74) *Attorney, Agent, or Firm* — Westerman, Hattori, Daniels & Adrian, LLP

(57) ABSTRACT

A fiber mount device 2 includes a fiber sub-mount main body 31 that is made of ceramic transmitting a laser beam having a predetermined wavelength, a bonding pad 33 that is provided on the upper surface of the fiber sub-mount main body 31, and a laser absorption layer 32 that is provided on at least a part of the lower surface of the fiber sub-mount main body 31 and absorbs the laser beam having the predetermined wavelength.

15 Claims, 6 Drawing Sheets

FIBER MOUNT DEVICE, OPTICAL MODULE USING SAME, AND OPTICAL MODULE MANUFACTURING METHOD

TECHNICAL FIELD

The present invention relates to a fiber mount device, an optical module using the fiber mount device, and a method of manufacturing the optical module, and more particularly, to a fiber mount device that can realize an optical module having a small characteristic variation by a simple structure, an optical module using the fiber mount device, and a method of manufacturing the optical module.

BACKGROUND ART

An optical module that enters a laser beam, which is emitted from a semiconductor laser element, to core of an optical fiber is known. In this optical module, generally, a laser sub-mount and a fiber mount are disposed on a base, relative positions of end portions of the semiconductor laser element and the optical fiber exactly correspond to each other, the semiconductor laser element is fixed on the laser sub-mount, and the optical fiber is fixed on the fiber mount.

The optical fiber is generally fixed to a bonding pad, which is formed on the upper surface of the fiber mount, by solder. This solder is usually melted by heat, which is caused by a laser beam, at the time of soldering. However, for the prevention of the modification, such as oxidation, of solder, the solder is not directly irradiated with a laser beam and the fiber mount is irradiated with a laser beam. As a result, the solder is melted through the conduction of heat from the heated fiber mount.

Incidentally, ceramic may be used for the fiber mount in terms of heat resistance and the like. However, some kinds of ceramic, which can be used for the fiber mount, transmit a laser beam that is used for heating. For this reason, there is a case in which it is difficult to heat the fiber mount by a laser beam as described above. Accordingly, in an optical module disclosed in the following Patent Document 1, a laser absorption layer, which is made of titanium, absorbs a laser beam, and converts the laser beam into heat, is provided on a fiber mount. However, since this laser absorption layer has low thermal conductivity, a large thermal gradient is generated on the surface of a bonding pad that is positioned on the same plane. When a thermal gradient on the surface of the bonding pad is large as described above, a portion having good solder wettability and a portion having poor solder wettability are formed on the bonding pad, so that the position of an optical fiber is shifted at the time of solidification of the solder. For this reason, there is a concern that the characteristics of the optical module have a variation. Accordingly, in the following Patent Document 1, a heat conductive layer made of nickel is provided in addition to the laser absorption layer so that heat generated in the laser absorption layer is conducted to the entire bonding pad.
[Patent Document 1] U.S. Pat. No. 6,758,610

SUMMARY OF THE INVENTION

Objects to be Achieved by the Invention

However, since a heat conductive layer other than the laser absorption layer needs to be provided in Patent Document 1, there is a problem in that structure is complex.

An object of the invention is to provide a fiber mount device that can realize an optical module having a small characteristic variation by a simple structure, an optical module using the fiber mount device, and a method of manufacturing the optical module.

Means for Achieving the Objects

In order to achieve the above object, a fiber mount device of the invention includes: a fiber sub-mount main body that is made of ceramic transmitting a laser beam having a predetermined wavelength; a bonding pad that is provided on the upper surface of the fiber sub-mount main body; and a laser absorption layer that is provided on at least a part of a lower surface of the fiber sub-mount main body and absorbs the laser beam having the predetermined wavelength.

According to this fiber mount device, the fiber sub-mount main body transmits the laser beam having the predetermined wavelength and the laser absorption layer can be irradiated with the laser beam. Since the laser absorption layer is irradiated with the laser beam as described above, the laser absorption layer absorbs the laser beam and generates heat and this heat is conducted from the lower surface of the fiber sub-mount main body to the upper surface thereof so that the bonding pad is heated. Further, since the heat spreads in the plane direction of the bonding pad while being conducted to the upper surface from the lower surface of the fiber sub-mount main body, it is possible to suppress a thermal gradient on the bonding pad. Since a heat conductive layer does not need to be provided as in Patent Document 1 as described above and the thermal gradient of the bonding pad can be suppressed, it is possible to simplify a structure.

Furthermore, when an optical fiber is soldered to the bonding pad in order to manufacture an optical module using the fiber mount device, it is possible to solder the optical fiber while a thermal gradient on the bonding pad has been suppressed. Accordingly, since it is possible to suppress the variation of the soldering of the optical fiber, it is possible to realize an optical module having a small characteristic variation.

Further, in the fiber mount device, it is preferable that the laser absorption layer is provided so as to protrude from the bonding pad.

Accordingly, the laser beam is not blocked by the bonding pad, the fiber sub-mount main body transmits the laser beam having the predetermined wavelength, and the laser absorption layer can be easily irradiated with the laser beam.

Further, in the fiber mount device, a base may be provided on the side of the laser absorption layer opposite to the fiber sub-mount main body.

In this case, it is preferable that a heat insulating member of which the thermal conductivity is lower than the thermal conductivity of the fiber sub-mount main body is provided between the laser absorption layer and the base.

Since the heat insulating member is provided, the conduction of the heat, which is generated in the laser absorption layer, to the base is suppressed. Accordingly, it is possible to more efficiently conduct this heat to the bonding pad through the fiber sub-mount main body.

Alternatively, it is preferable that the fiber sub-mount main body include a beam portion that is partitioned from the base by a space, the bonding pad be provided on the upper surface of the beam portion, and the laser absorption layer be provided on at least a part of the lower surface of the beam portion.

According to this structure, the conduction of heat, which is generated in the laser absorption layer, to the base in a short circuit manner is suppressed by the space. Accordingly, it is possible to more efficiently conduct this heat to the bonding pad through the fiber sub-mount main body.

Further, an optical module of the invention includes: the fiber mount device according to any one of claims 1 to 5; and an optical fiber that is soldered on the bonding pad by heat that is caused by the laser beam having the predetermined wavelength and irradiating the laser absorption layer.

Since an optical fiber is soldered on the bonding pad of which the thermal gradient has been suppressed in this optical module, it is possible to reduce the characteristic variation.

Further, a method of manufacturing an optical module of the invention includes: a preparation step of preparing any one of the above fiber mount devices and an optical fiber; a disposition step of disposing solder and the optical fiber on the bonding pad; and a soldering step of heating the laser absorption layer by irradiating the laser absorption layer with the laser beam having the predetermined wavelength, and soldering the optical fiber to the bonding pad by heat.

Since an optical fiber is soldered on the bonding pad of which the thermal gradient has been suppressed in this method of manufacturing the optical module, it is possible to manufacture an optical module that has a small characteristic variation.

Effect of the Invention

As described above, according to the invention, there are provided a fiber mount device that can realize an optical module having a small variation by a simple structure, and an optical module using the fiber mount device, and a method of manufacturing the optical module.

EMBODIMENT OF THE INVENTION

Preferred embodiments of a fiber mount device according to the invention, an optical module using the fiber mount device, and a method of manufacturing the optical module will be described in detail below with reference to the drawings.

(First Embodiment)

Figure 1:
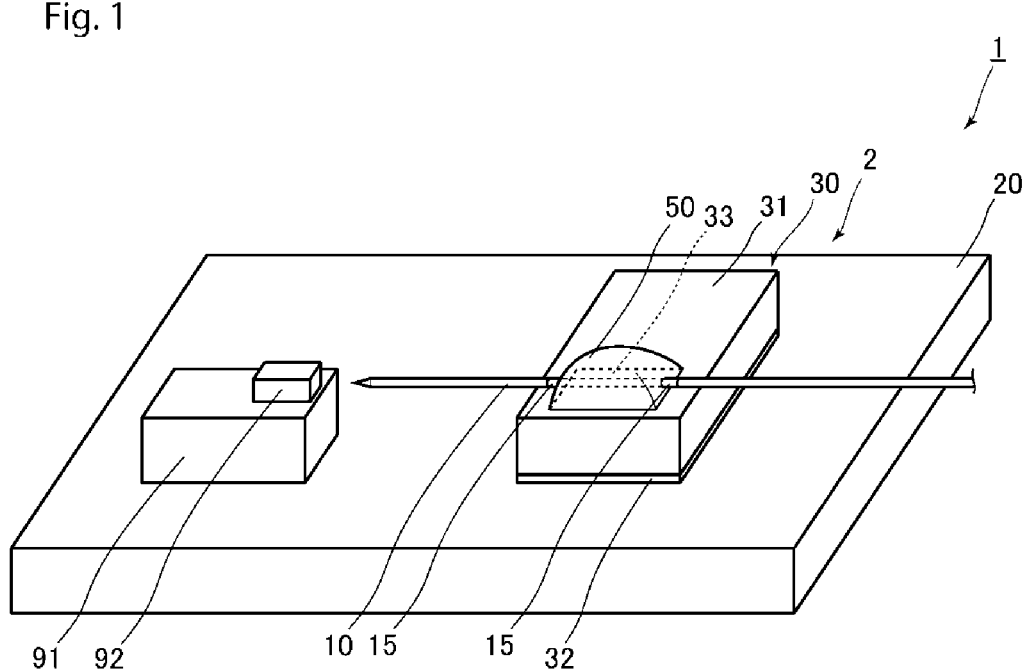
FIG. 1 is a diagram illustrating an optical module according to a first embodiment of the invention.

FIG. 1 is a diagram illustrating an optical module according to a first embodiment of the invention.

As illustrated in FIG. 1, an optical module 1 includes a base 20, a laser sub-mount 91 that is disposed on the base 20, a semiconductor laser element 92 that is disposed on the laser sub-mount 91, a fiber sub-mount 30 that is disposed on the base 20, and an optical fiber 10 that is soldered on the fiber sub-mount 30 by solder 50, as main components. As described above, the optical module 1 of this embodiment is an optical module that emits a laser beam emitted from the semiconductor laser element 92 to the outside by the optical fiber 10.

Meanwhile, in this embodiment, the base 20 and the fiber sub-mount 30 form a fiber mount device 2.

The optical module 1 is received in a housing (not illustrated) made of metal or the like. The base 20 is formed of a plate-like member that is made of, for example, metal or ceramic. When the material of the base 20 is metal, this metal is not particularly limited but examples of this metal may include copper and copper tungsten. When the material of the base 20 is ceramic, this ceramic is not particularly limited but examples of this ceramic may include aluminum nitride (AlN) and aluminum oxide ($Al_2O_3$). Further, when the material of the base 20 is the same as the material of the housing, the base 20 may be formed of a part of the housing.

The laser sub-mount 91 disposed on the base 20 has a substantially rectangular parallelepiped shape, and is fixed on the base 20 by a solder material (not illustrated). The material of the laser sub-mount 91 is not particularly limited, but examples of the material of the laser sub-mount 91 may include ceramic, such as AlN and $Al_2O_3$. AlN is preferable among them in terms of excellent thermal conductivity. Furthermore, when the base 20 and the laser sub-mount 91 are made of the same ceramic, the base 20 and the laser sub-mount 91 may be integrally molded.

The semiconductor laser element 92 is fixed on the laser sub-mount 91 by a solder material (not illustrated). A plurality of semiconductor layers are laminated in the semiconductor laser element 92, and these semiconductor layers form a resonator structure. Further, a laser beam having a wavelength of, for example, 900 nm is emitted from the surface of the semiconductor laser element 92 facing the optical fiber 10.

The fiber sub-mount 30 disposed on the base 20 includes a fiber sub-mount main body 31, a laser absorption layer 32 that is provided on the lower surface of the fiber sub-mount main body 31, and a bonding pad 33 that is provided on the upper surface of the fiber sub-mount main body 31.

The fiber sub-mount main body 31 has a substantially rectangular parallelepiped shape. Moreover, the fiber sub-mount main body 31 transmits a laser beam having a predetermined wavelength. This predetermined wavelength is not particularly limited, but is at least a part of a wavelength in the range of about 800 nm to about 10 μm. When a light absorption coefficient is denoted by α and the thickness of the fiber sub-mount main body 31 is denoted by t, the transmittance T of a laser beam penetrating the fiber sub-mount main body 31 from the upper surface toward the lower surface is represented by "$T=e^{-\alpha t}$". It is preferable that the transmittance T be 25% or more. The material of the fiber sub-mount main body 31 is not particularly limited depending on the thickness of the fiber sub-mount main body 31, but examples of the material of the fiber sub-mount main body 31 may include ceramic, such as AlN, $Al_2O_3$, zinc oxide (ZnO), and quartz glass ($SiO_2$). AlN is preferable among them since the thermal conductivity is relatively high. When the material of the fiber sub-mount main body 31 is AlN, light having a wavelength in the range of about 300 nm to 6000 μm can penetrate the fiber sub-mount main body 31 and a laser beam having a wavelength of, for example, 808 nm can penetrate the fiber sub-mount main body 31 at a transmittance of about 25% per a thickness of 0.3 mm.

The laser absorption layer 32 is provided on the entire lower surface of the fiber sub-mount main body 31. The laser absorption layer 32 is adapted to absorb a laser beam having a predetermined wavelength that penetrates the fiber sub-mount main body 31. As long as the laser absorption layer 32 absorbs a laser beam, the laser absorption layer 32 is not particularly limited. For example, the laser absorption layer 32 is formed of a laminate of which the side close to the fiber sub-mount main body 31 is formed of a metal layer plated with titanium (Ti), nickel (Ni), or the like and in which Au is laminated on the side of the metal layer opposite to the fiber sub-mount main body 31. It is preferable that the metal layer facing the fiber sub-mount main body 31 be made of Ti since the metal layer made of Ti has a high absorption rate of a laser beam and heat generation efficiency. For example, when the metal layer facing the fiber sub-mount main body 31 is made of Ti, the metal layer can absorb about 100% of a laser beam having a wavelength of 808 nm and convert the laser beam into heat. An Au layer is a protective layer that mainly absorbs a laser beam and is provided to protect the metal layer facing the fiber sub-mount main body 31.

The bonding pad 33 is provided on a part of the upper surface of the fiber sub-mount main body 31, and has a substantially quadrangular shape. The bonding pad 33 is adapted so that solder is fixed to the bonding pad 33. For example, a titanium (Ti) layer is laminated so as to face the fiber sub-mount main body 31, a platinum (Pt) layer is laminated on the Ti layer, a gold (Au) layer is laminated on the Pt layer, and the surface of the Au layer forms the surface of the bonding pad 33 opposite to the fiber sub-mount main body 31.

Meanwhile, since the laser absorption layer 32 is provided on the entire lower surface of the fiber sub-mount main body 31 and the bonding pad 33 is provided on a part of the upper surface of the fiber sub-mount main body 31 as described above, the laser absorption layer 32 is provided so as to protrude from the bonding pad 33. In other words, the laser absorption layer 32 has a positional relation in which the laser absorption layer 32 includes an area not hidden behind the bonding pad 33 when seen from the upper surface on which the source of a laser beam is positioned.

The lower surface of the laser absorption layer 32 of the fiber sub-mount 30 (the side of the fiber sub-mount 30 opposite to the fiber sub-mount main body 31) is fixed on the base 20 in the same manner as the laser sub-mount 91.

The solder 50 is fixed on the bonding pad 33. Examples of this solder 50 may include gold-tin eutectic solder, and examples of a ratio between Au and tin (Sn) may include Au80%-Sn20% and Au10%-Sn90%. When the solder 50 corresponds to Au80%-Sn20%, the melting point of the solder 50 is about 280° C.

Figure 2:
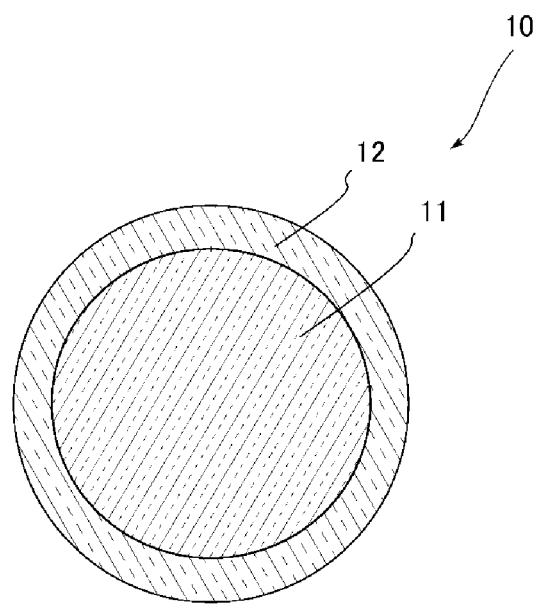
FIG. 2 is a diagram illustrating the structure of the cross-section of the optical fiber perpendicular to the longitudinal direction of the optical fiber.

FIG. 2 is a diagram illustrating the structure of the cross-section of the optical fiber 10 perpendicular to the longitudinal direction of the optical fiber 10 of the optical module 1. As illustrated in FIG. 2, the optical fiber 10 includes a core 11 and a clad 12 surrounding the outer peripheral surface of the core 11. The refractive index of the clad 12 is lower than that of the core 11, the core is made of, for example, glass to which a dopant increasing a refractive index such as germanium has been added, and the clad is made of, for example, pure quartz to which no dopant has been added. Further, although not particularly illustrated, the clad 12 is covered with a covering layer, which is made of an ultraviolet curing resin or the like, outside the optical module 1.

Furthermore, in this embodiment, an end portion of the optical fiber 10 is formed to be tapered and has a function as a lens.

Moreover, the optical fiber 10 passes through the solder 50, and is disposed so that the tapered end portion of the optical fiber 10 faces the light emitting surface of the semiconductor laser element 92 and a laser beam emitted from the semiconductor laser element 92 is incident on the core 11.

In addition, the optical fiber 10 is covered with a metallized layer 15 at least inside the solder 50, and the metallized layer 15 is fixed to the solder 50. This metallized layer 15 is adapted to easily get wet by the solder 50 and to easily be fixed. The structure of the metallized layer is not particularly limited. However, the metallized layer is formed of a laminate including a Ni layer and an Au layer, the Ni layer covers the outer peripheral surface of the clad 12, and the Au layer covers the outer peripheral surface of the Ni layer. Further, the thicknesses of the Ni layer and the Au layer are not particularly limited. However, the thickness of the Ni layer is in the range of 2 μm to 3 μm, and the thickness of the Au layer is in the range of 0.1 μm to 0.2 μm. Generally, in the optical module, soldering is performed without flux. Accordingly, it is preferable that the surface of the metallized layer 15 be made of Au in order to increase wettability. The Ni layer facing the optical fiber is formed as an underlayer in order to increase the adhesion of Au to quartz.

Accordingly, in this embodiment, the surface of the bonding pad 33, the solder 50, and the surface of the metallized layer 15 are formed to contain Au.

When electric power is supplied to the optical module 1 from the outside (not illustrated), a laser beam is emitted from the semiconductor laser element 92. The wavelength of the emitted laser beam is, for example, 900 nm as described above. The emitted laser beam is incident on the core 11 of the optical fiber 10, is propagated through the core 11, and is emitted to the outside of the optical module 1.

Meanwhile, when a laser beam is incident on the optical fiber 10, the laser beam is incident on the core 11 as described above. However, a part of the laser beam may be incident on the clad 12 as leaked light due to the refraction on the end face of the optical fiber 10, the misalignment between the optical axes of the optical fiber 10 and the semiconductor laser element 92, or the like. In this case, leaked light is mainly propagated through the clad 12, and reaches a portion where the optical fiber 10 is covered with the metallized layer 15. Further, at least a part of the leaked light is absorbed in the metallized layer 15 and is converted into heat. The heat, which is generated in this case, is released to the outside through the solder 50, the fiber sub-mount 30, and the base 20.

Next, a method of manufacturing the optical module 1 will be described.

Figure 3:
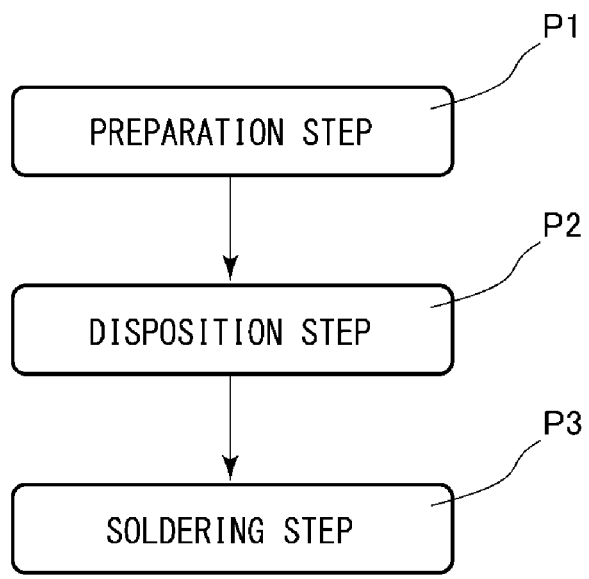
FIG. 3 is a flowchart illustrating steps of a method of manufacturing the optical module.

FIG. 3 is a flowchart illustrating steps of a method of manufacturing the optical module 1 of FIG. 1. As illustrated in FIG. 3, the method of manufacturing the optical module 1 includes: a preparation step P1 of preparing the fiber mount device 2, the optical fiber 10, and the solder 50; a disposition step P2 of disposing the optical fiber 10 and the solder 50 on the bonding pad 33; and a soldering step P3 of soldering the optical fiber 10 to the bonding pad 33 by the solder 50.

<Preparation Step P1>

First, the fiber mount device 2, the optical fiber 10, and the solder 50 are prepared.

For the preparation of the fiber mount device 2, the base 20 and the fiber sub-mount 30 are prepared. For the preparation of the fiber sub-mount 30, the fiber sub-mount main body 31 is prepared and the bonding pad 33 is provided on the upper surface of the fiber sub-mount main body 31. The bonding pad 33 may be provided by film forming processing, such as an evaporation method, a sputtering method, or a plating method. Further, the laser absorption layer 32 is provided on the lower surface of the fiber sub-mount main body 31. The laser absorption layer 32 may be provided by the same method as the bonding pad 33.

Furthermore, the laser absorption layer 32 of the fiber sub-mount 30 is soldered to the base 20 by solder (not illustrated), and the fiber sub-mount 30 is fixed to the base 20.

Moreover, in this step, the laser sub-mount 91 is soldered and fixed to the base 20 by solder (not illustrated) and the semiconductor laser element 92 is fixed on the laser sub-mount 91 by a solder material (not illustrated).

The optical fiber 10 includes an area to be soldered to the bonding pad 33, and the above-mentioned metallized layer 15 is provided so as to be longer than this area. Specifically, the metallized layer 15 is provided on both sides of the area to be soldered, so as to protrude. The length of the area to be soldered may be considered as the same as the width of the bonding pad 33 along the longitudinal direction of the optical fiber 10 when the optical fiber 10 is soldered to the bonding pad 33 as illustrated in FIG. 1. Accordingly, in this case, the metallized layer 15 may be provided so that the length of the metallized layer 15 is longer than the width of the bonding pad 33 along the longitudinal direction of the optical fiber 10.

When the metallized layer 15 is, for example, a laminate including a Ni layer and an Au layer as described above, it is preferable that the metallized layer 15 be provided by a plating method. The reason for this is that it is possible to form the metallized layer 15 having a more uniform thickness on the side surface of the optical fiber 10 of which the cross-section perpendicular to the longitudinal direction has a circular shape, according to a plating method.

An appropriate amount of solder 50 is prepared to fix the optical fiber 10 to the fiber sub-mount 30, and a required amount of solder is provided as one lump so as to be capable of being disposed on the fiber sub-mount 30. Meanwhile, it is preferable that flux is not added to the solder 50 in terms of the prevention of the adhesion of flux to the tapered end portion of the optical fiber 10 or the light emitting surface of the semiconductor laser element 92, the prevention of the oxidation or sulfuration of the solder 50, and the improvement of the reliability of the optical module 1.

<Disposition Step P2>

Figure 4A:
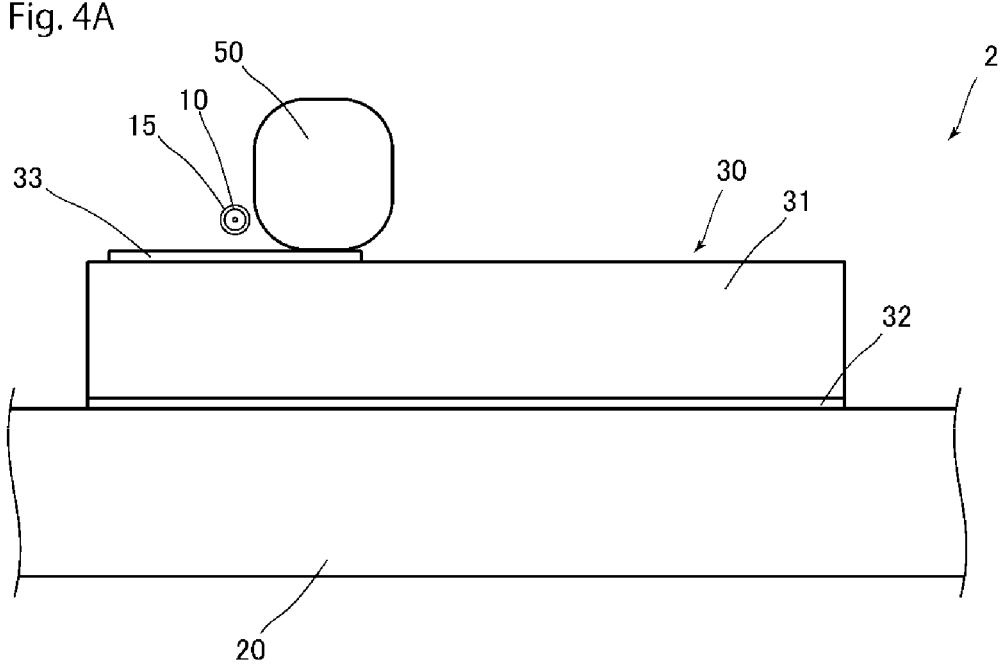
FIGS. 4A and 4B are diagrams illustrating an aspect in which a disposition step has been performed.
Figure 4B:
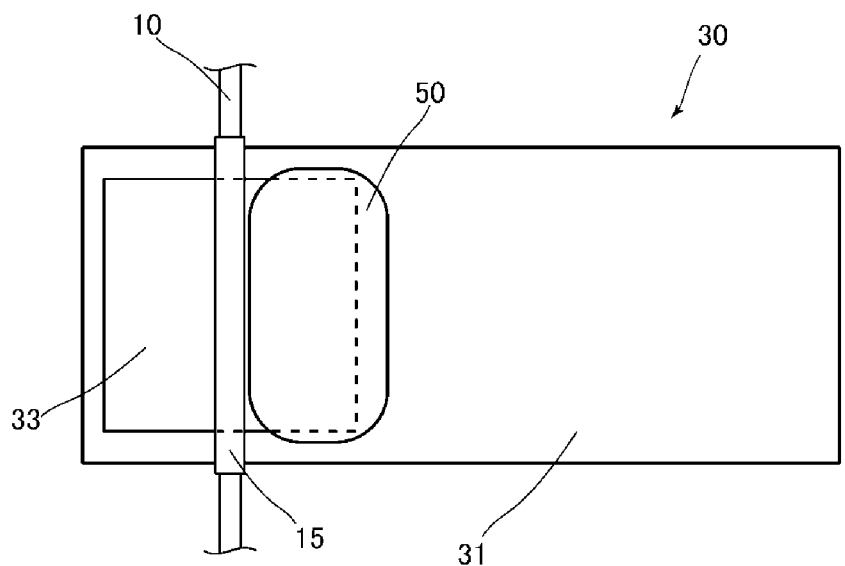

Next, the optical fiber 10 and the solder 50 are disposed on the prepared fiber sub-mount 30. FIGS. 4A and 4B are diagrams illustrating an aspect in which a disposition step P2 has been performed. Specifically, FIG. 4A is a diagram when the fiber sub-mount 30 is seen in the axial direction of the optical fiber 10, and FIG. 4B is a plan view of the bonding pad 33. Meanwhile, the base 20 is omitted in FIG. 4B.

As illustrated in FIGS. 4A and 4B, in this step, the solder 50 is disposed on an end portion of the bonding pad 33.

Further, the optical fiber 10 is disposed so that the central axis of the optical fiber 10 corresponds to the optical axis of a laser beam emitted from the semiconductor laser element 92. In the disposition of the optical fiber 10, the position of the optical fiber 10 is fixed by using a jig (not illustrated) so that the optical fiber 10 slightly floats up from the bonding pad 33 as illustrated in FIG. 4A. Both end portions of the metallized layer 15 protrude from the bonding pad 33 at this fixed position as illustrated in FIG. 4B.

In this way, the optical fiber 10 and the solder 50 are disposed on the fiber sub-mount 30 as illustrated in FIGS. 4A and 4B.

<Soldering Step P3>

Figure 5:
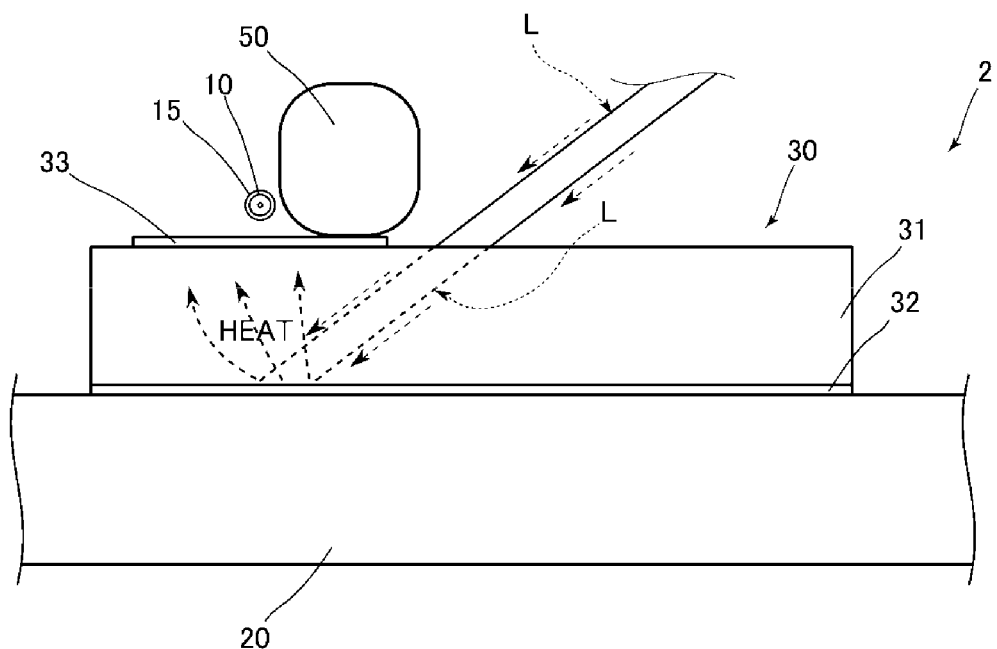
FIG. 5 is a diagram illustrating an aspect of a soldering step.

Next, the solder 50 disposed on the bonding pad 33 is melted by heating, and adheres to the bonding pad 33 and the metallized layer 15. FIG. 5 is a diagram when an aspect of the soldering step P3 is seen from the same viewpoint as FIG. 4A. As illustrated in FIG. 5, solder is heated by the irradiation of a laser beam L.

An area of the upper surface of the fiber sub-mount main body 31 on which the bonding pad 33 is not present is irradiated with the laser beam L. The laser beam L is a laser beam that has the same wavelength as a predetermined wavelength of light capable of penetrating the fiber sub-mount main body 31. Accordingly, at least a part of the laser beam L penetrates the fiber sub-mount main body 31, reaches the laser absorption layer 32, is absorbed in the laser absorption layer 32, and is converted into heat. The laser beam L is, for example, a laser beam that is emitted from a semiconductor laser and has a wavelength of 808 nm.

Meanwhile, in this embodiment, as illustrated in FIG. 5, it is preferable that an area of the laser absorption layer 32 under the bonding pad 33 be irradiated with the laser beam L from the area of the upper surface of the fiber sub-mount main body 31 on which the bonding pad 33 is not present. It is possible to further suppress the thermal gradient of the bonding pad 33 to be described below by performing the irradiation of the laser beam in this way. Alternatively, when the laser absorption layer 32 is provided so as to protrude from the bonding pad 33 as in this embodiment, the laser beam L is not blocked by the bonding pad 33 and the laser absorption layer 32 can be easily irradiated through the fiber sub-mount main body 31 with the laser beam L. In terms of this, the area of the laser absorption layer 32, which protrudes from the bonding pad 33, may be irradiated with the laser beam L from the area of the upper surface of the fiber sub-mount main body 31 on which the bonding pad 33 is not present.

Heat, which is generated in the laser absorption layer 32, is conducted while being diffused in the fiber sub-mount main body 31, and is transferred to the bonding pad 33. The bonding pad 33 is heated by the conduction of heat generated from the laser absorption layer 32 in this way and this heat is further conducted to the solder 50, so that the solder 50 is melted.

Meanwhile, it is preferable that this step be performed under an inert gas atmosphere in terms of the prevention of the oxidation of the solder 50.

The melted solder 50 wets and spreads on the entire surface of the bonding pad 33 exposed to the outside, adheres to the bonding pad 33, and wets, spreads on, and adheres to the metallized layer 15 so as to be caught by the metallized layer 15 of the optical fiber 10. Further, the melted solder 50 is solidified after the end of the irradiation of the laser beam L, so that the optical fiber 10 is fixed to the fiber sub-mount 30 of the fiber mount device 2. Accordingly, the optical module 1 illustrated in FIG. 1 is obtained.

According to the method of manufacturing the optical module using the fiber mount device 2 of this embodiment, as described above, heat generated in the laser absorption layer 32 spreads in the plane direction of the bonding pad 33 while being conducted through the fiber sub-mount main body 31 from the lower surface toward the upper surface. Accordingly, it is possible to suppress the thermal gradient of the bonding pad 33. That is, since it is possible to make a position where the deviation of a distance from a source of heat generated by the absorption of a laser beam is small be present on the entire surface of the bonding pad 33, it is possible to suppress the thermal gradient of the bonding pad 33 as compared to a method in the related art in which a source of heat generated by the absorption of a laser beam is positioned on the same plane as the bonding pad 33. Since soldering can be performed while the thermal gradient of the bonding pad 33 has been suppressed as described above, it is possible to suppress the variation of the soldering position of the optical fiber 10.

Accordingly, it is possible to realize the optical module 1 having a small characteristic variation.

Since heat generated in the laser absorption layer 32 spreads in the fiber sub-mount main body 31 in the plane direction of the bonding pad 33, the fiber mount device 2 does not particularly need to include a heat conductive layer. Accordingly, it is possible to realize an optical module, which has a small variation by a simple structure.

(Second Embodiment)

Figure 6:
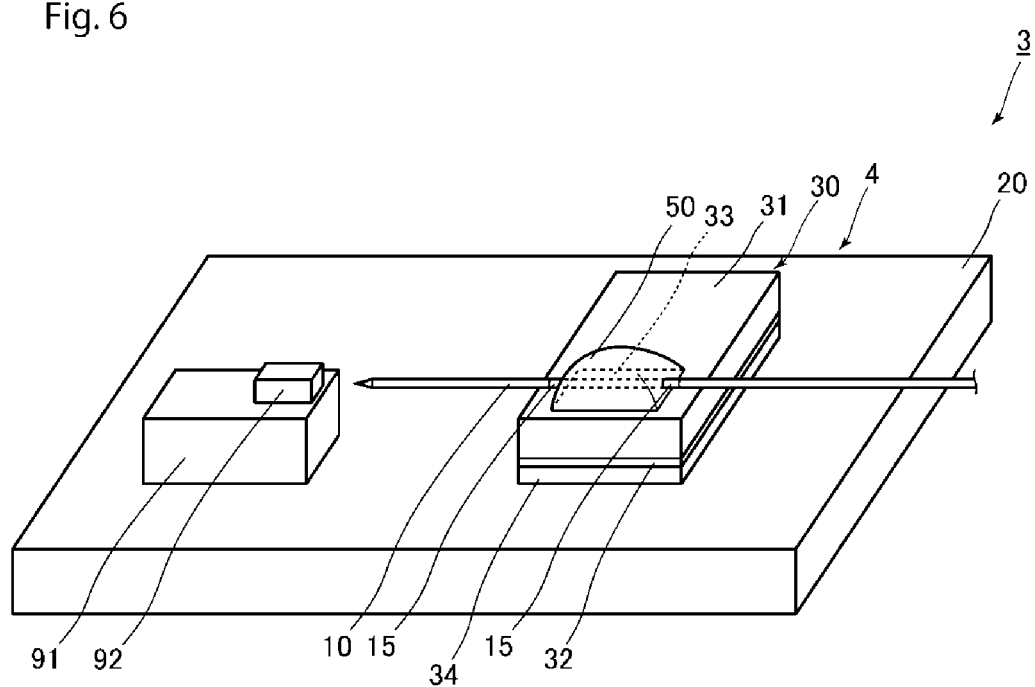
FIG. 6 is a diagram illustrating an optical module according to a second embodiment of the invention.

Next, a second embodiment of the invention will be described in detail with reference to FIG. 6. Meanwhile, the same components as the components of the first embodiment or components equivalent to the components of the first embodiment will be denoted by the same reference numerals except when being particularly described, and the repeated description thereof will be omitted. FIG. 6 is a diagram illustrating an optical module according to the second embodiment of the invention.

As illustrated in FIG. 6, an optical module 3 of this embodiment uses a fiber mount device 4 instead of the fiber mount device 2 of the first embodiment and the fiber mount device 4 is different from the fiber mount device 2 of the first embodiment in that a heat insulating member 34 of which the thermal conductivity is lower than that of a fiber sub-mount main body 31 is provided between a laser absorption layer 32 and a base 20.

The heat insulating member 34 may be provided on the entire surface of the laser absorption layer 32 facing the base 20, and may be provided on a part of the surface of the laser absorption layer 32 facing the base 20. As long as the thermal conductivity of the heat insulating member 34 is lower than that of the fiber sub-mount main body 31, the material of the heat insulating member 34 is not particularly limited. For example, when the fiber sub-mount main body 31 is made of AlN, examples of the material of the heat insulating member 34 may include molybdenum (Mo), nickel (Ni), aluminum oxide ($Al_2O_3$), zirconium oxide ($ZrO_2$), and glass. When the fiber sub-mount main body 31 is made of $Al_2O_3$, examples of the material of the heat insulating member 34 may include $ZrO_2$ and glass. When the fiber sub-mount main body 31 is made of ZnO, examples of the material of the heat insulating member 34 may include $ZrO_2$ and glass.

The optical module 3 can be manufactured in the following manner.

First, the optical fiber 10 and solder 50 are prepared and the fiber mount device 4 is further prepared in the same manner as the first embodiment in a preparation step P1.

For the preparation of the fiber mount device 4, in the same manner as the first embodiment, the laser absorption layer 32 and the bonding pad 33 are provided on the fiber sub-mount main body 31. Further, the heat insulating member 34 is provided on at least a part of the surface of the laser absorption layer 32 opposite to the fiber sub-mount main body 31.

The heat insulating member 34 may be directly provided on the surface of the laser absorption layer 32 by sputtering or a plating method, and the heat insulating member 34 having been separately prepared may be bonded to the laser absorption layer 32.

Furthermore, when the heat insulating member 34 is to be provided on the entire surface of the laser absorption layer 32, the heat insulating member 34 is fixed to the base 20 by soldering. When the heat insulating member 34 is to be provided on a part of the laser absorption layer 32, the heat insulating member 34 and the laser absorption layer 32 are fixed to the base 20 by soldering.

Next, the optical fiber 10 and the solder 50 are disposed on the prepared fiber mount device 4 in the same manner as the first embodiment so that a disposition step P2 is performed.

Next, in the same manner as the first embodiment, a soldering step P3 is performed by the irradiation of a laser beam L. In this case, the conduction of heat, which is generated in the laser absorption layer 32, to the base 20 is suppressed by the heat insulating member 34, and the heat generated in the laser absorption layer 32 is conducted to the fiber sub-mount main body 31. Accordingly, it is preferable that an area of the laser absorption layer 32 overlapping the heat insulating member 34 be irradiated with the laser beam L since heat can be more efficiently conducted to the fiber sub-mount main body 31.

According to the method of manufacturing the optical module 3 using the fiber mount device 4 of this embodiment, it is possible to more efficiently conduct heat, which is generated in the laser absorption layer 32, to the bonding pad 33 through the fiber sub-mount main body 31 by providing the heat insulating member 34.

Meanwhile, it is preferable that the heat insulating member 34 be provided on the entire surface of the laser absorption layer 32, since heat, which is generated in the laser absorption layer 32, can be more efficiently conducted toward the fiber sub-mount main body 31 in the soldering step P3. It is preferable that the heat insulating member 34 be provided on a part of the laser absorption layer 32, since heat, which is generated in the metallized layer 15 of the optical fiber 10 when the optical module 3 is used, is easily conducted to the base 20 from a portion on which the heat insulating member 34 is not provided and the heat can be efficiently released.

(Third Embodiment)

Figure 7:
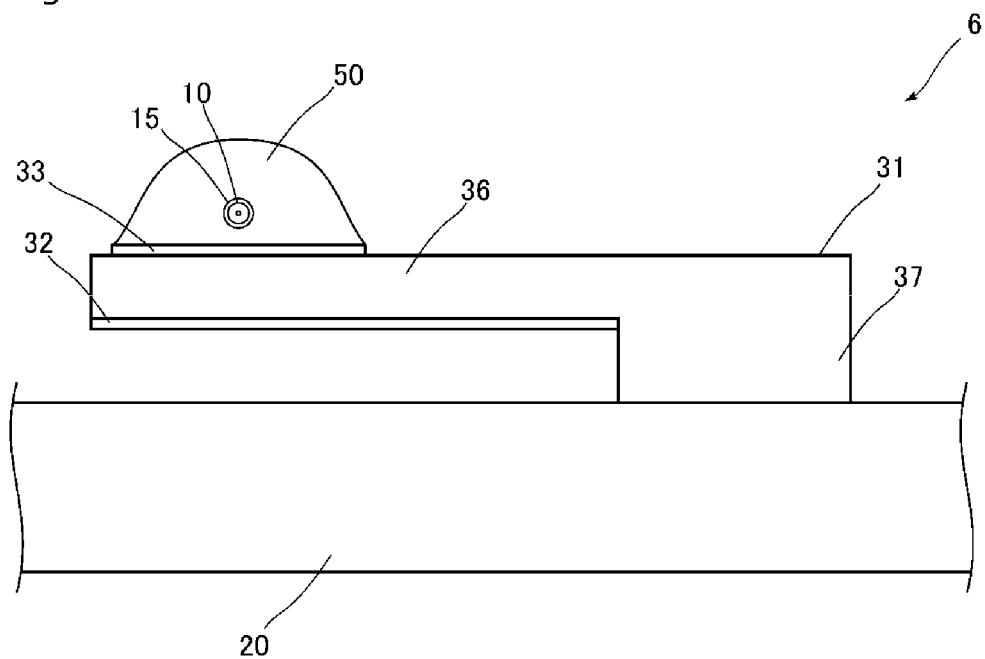
FIG. 7 is a diagram illustrating an optical module according to a third embodiment of the invention.

Next, a third embodiment of the invention will be described in detail with reference to FIGS. 7 and 8. Meanwhile, the same components as the components of the first embodiment or components equivalent to the components of the first embodiment will be denoted by the same reference numerals except when being particularly described, and the repeated description thereof will be omitted. FIG. 7 is a diagram illustrating an optical module according to the third embodiment of the invention.

As illustrated in FIG. 7, an optical module of this embodiment uses a fiber mount device 6 instead of the fiber mount device 2 of the first embodiment and the fiber mount device 6 is different from the fiber mount device 2 of the first embodiment in that a fiber sub-mount main body 31 includes a beam portion 36 partitioned from the base 20 by a space, a bonding pad 33 is provided on the upper surface of the beam portion 36, and a laser absorption layer 32 is provided on at least a part of the lower surface of the beam portion 36.

The fiber sub-mount main body 31 includes the beam portion 36 and a pillar portion 37 of which the thickness is larger than the thickness of the beam portion 36, and the beam portion 36 has a cantilever structure. Further, the pillar portion 37 is fixed to the base 20 by soldering, so that the beam portion 36 and the base 20 are partitioned by a space.

The optical module is manufactured as described below.

First, the fiber sub-mount main body 31 including the beam portion 36 is prepared in a preparation step P1. The beam portion 36 and the pillar portion 37 may be formed by cutting a rectangular parallelepiped ceramic that is to be formed into the fiber sub-mount main body 31, and may be formed by shaping a ceramic material before firing into the fiber sub-mount main body 31 including the beam portion 36 and the pillar portion 37 and firing the ceramic material.

Next, the bonding pad 33 is provided on the upper surface of the beam portion 36 of the prepared fiber sub-mount main body 31 in the same manner as the first embodiment. In addition, the laser absorption layer 32 is provided on the lower surface of the beam portion 36 in the same manner as the first embodiment. Next, the lower surface of the pillar portion 37 of the fiber sub-mount main body 31 is fixed to the base 20 by soldering. The fiber mount device 6 of which the beam portion 36 and the base 20 are partitioned by a space is obtained in this way.

Next, the optical fiber 10 and the solder 50 are disposed on the bonding pad 33 in the same manner as the first embodiment so that a disposition step P2 is performed.

Figure 8:
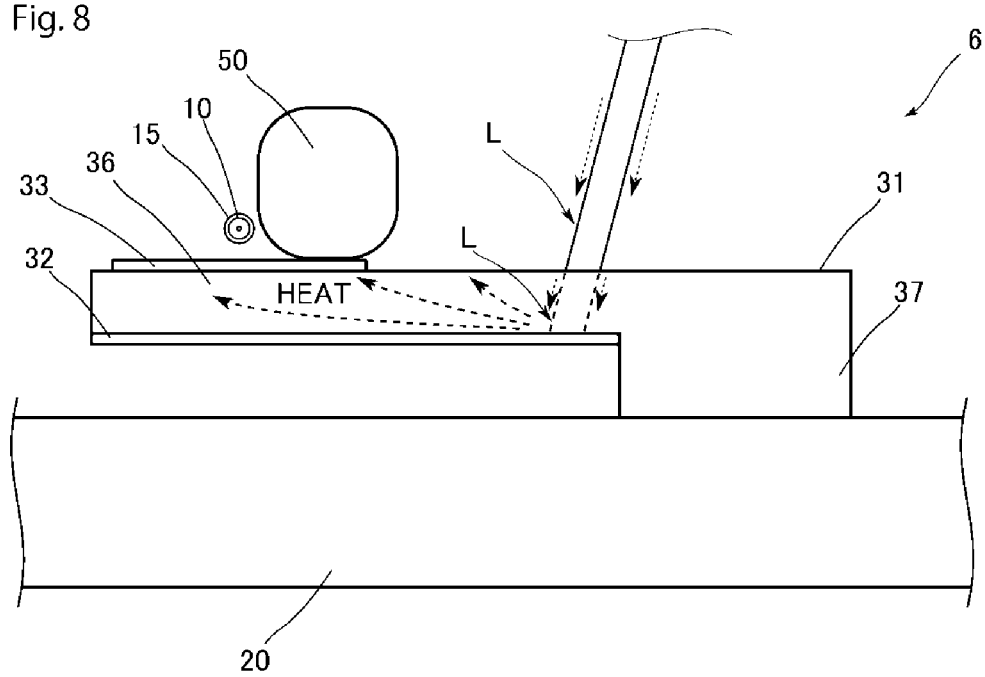
FIG. 8 is a diagram illustrating an aspect of a soldering step of the third embodiment of the invention.

After that, the laser absorption layer 32 is irradiated with a laser beam L through the fiber sub-mount main body 31 in the same manner as the first embodiment as illustrated in FIG. 8 so that a soldering step P3 is performed. In this case, an area of the laser absorption layer 32 under the bonding pad 33 may be irradiated with the laser beam L from an area of the upper surface of the fiber sub-mount main body 31 on which the bonding pad 33 is not present. As illustrated in FIG. 8, an area of the laser absorption layer 32 protruding from the bonding pad 33 may be irradiated with the laser beam L from the area of the upper surface of the fiber sub-mount main body 31 on which the bonding pad 33 is not present. Since a space is formed on the side of the laser absorption layer 32 facing the base 20 in this embodiment, most of heat generated in the laser absorption layer 32 is conducted through the beam portion 36 of the fiber sub-mount main body 31. Further, the bonding pad 33 provided on the upper surface of the beam portion 36 is heated by the heat that is conducted through the beam portion 36. The solder 50 is melted in this way, so that the optical fiber 10 is soldered to the bonding pad 33 in the same manner as the first embodiment.

According to the method of manufacturing the optical module using the fiber mount device 6 of this embodiment, the conduction of heat, which is generated in the laser absorption layer 32, to the base 20 is prevented by the space. Accordingly, it is possible to more efficiently conduct this heat to the bonding pad 33 through the beam portion 36 of the fiber sub-mount main body 31. Therefore, it is possible to more efficiently perform the soldering step.

Moreover, heat, which is generated in the metallized layer 15 of the optical fiber 10 when the optical module is used, is conducted to the base 20 from the beam portion 36 of the fiber sub-mount main body 31 through a portion except for the beam portion 36. Accordingly, heat can be released.

(Fourth Embodiment)

Figure 9:
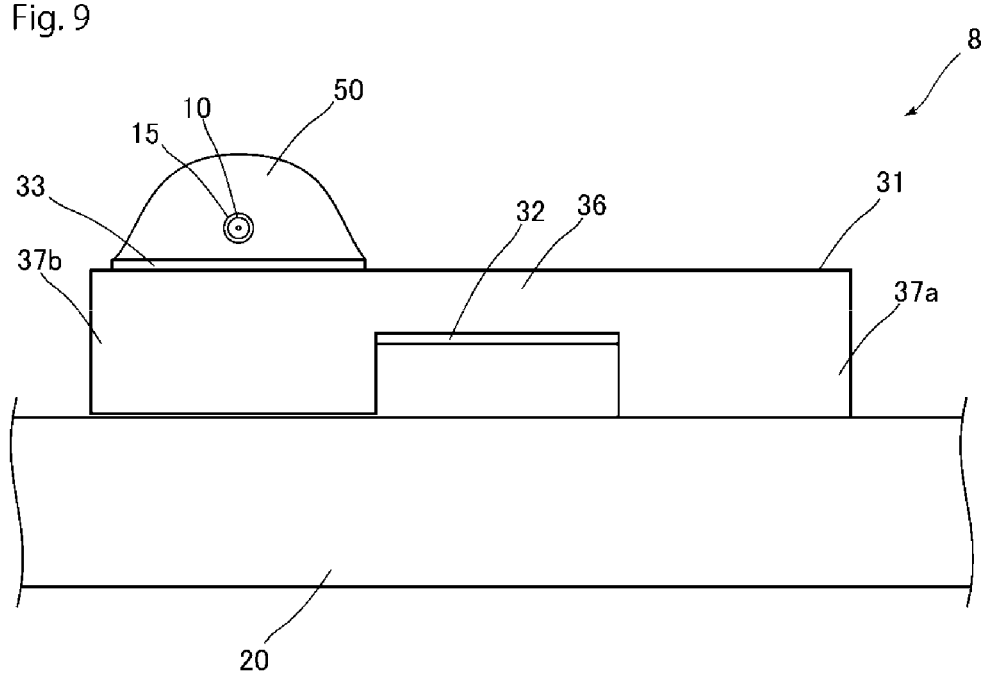
FIG. 9 is a diagram illustrating an optical module according to a fourth embodiment of the invention.

Next, a fourth embodiment of the invention will be described in detail with reference to FIG. 9. Meanwhile, the same components as the components of the third embodiment or components equivalent to the components of the third embodiment will be denoted by the same reference numerals except when being particularly described, and the repeated description thereof will be omitted. FIG. 9 is a diagram illustrating an optical module according to the fourth embodiment of the invention.

As illustrated in FIG. 9, an optical module of this embodiment uses a fiber mount device 8 instead of the fiber mount device 6 of the third embodiment and the fiber mount device 8 is different from the fiber mount device 6 of the third embodiment in that a beam portion 36 of a fiber sub-mount main body 31 has a both-end support structure and a bonding pad 33 is provided on the upper surface of a portion of the fiber sub-mount main body except for the beam portion 36.

The fiber sub-mount main body 31 includes the beam portion 36 and a pair of pillar portions 37a and 37b that are connected to both end portions of the beam portion 36 and are thicker than the beam portion 36, and the beam portion 36 has a both-end support structure. Further, one pillar portion 37a is fixed to the base 20 by solder and the other pillar portion 37b slightly floats up from the base 20 without being fixed to the base 20. In this way, the beam portion 36 and the base 20 are partitioned by a space. Furthermore, the bonding pad 33 is formed on the upper surface of the pillar portion 37b that slightly floats up from the base 20. In other words, the fiber sub-mount main body 31 of this embodiment has a structure in which the thickness of a portion, which overlaps the bonding pad, of the cantilever beam portion 36 of the third embodiment is substantially the same as the thickness of the pillar portion 37.

According to this fiber mount device, even when an external force is applied to the optical fiber 10, it is possible to prevent the breakage of the beam portion 36 that is caused by the contact between the pillar portion 37b and the base 20. Accordingly, it is possible to improve reliability.

The optical module is manufactured as described below.

First, the fiber sub-mount main body 31 including the beam portion 36 is prepared in a preparation step P1. The beam portion 36 and the pillar portions 37a and 37b may be formed by cutting a rectangular parallelepiped ceramic that is to be formed into the fiber sub-mount main body 31, and may be formed by shaping a ceramic material before firing into the fiber sub-mount main body 31 including the beam portion 36 and the pillar portions 37a and 37b and firing the ceramic material.

Next, the bonding pad 33 is provided on the upper surface of the pillar portion 37b of the prepared fiber sub-mount main body 31 in the same manner as the first embodiment. In addition, the laser absorption layer 32 is provided on the lower surface of the beam portion 36 in the same manner as the first embodiment. Next, the lower surface of the pillar portion 37a of the fiber sub-mount main body 31 is fixed to the base 20 by soldering. The fiber mount device 8 of which the beam portion 36 and the base 20 are partitioned by a space is obtained in this way.

Next, the optical fiber 10 and the solder 50 are disposed on the bonding pad 33 in the same manner as the first embodiment so that a disposition step P2 is performed.

After that, the laser absorption layer 32 is irradiated with a laser beam L through the fiber sub-mount main body 31 in the same manner as the first embodiment so that a soldering step P3 is performed. In this case, since a space is formed on the side of the laser absorption layer 32 facing the base 20, most of heat generated in the laser absorption layer 32 is conducted through the beam portion 36 of the fiber sub-mount main body 31. Further, the bonding pad 33 provided on the upper surface of the pillar portion 37b is heated by the heat that is conducted to the pillar portion 37b from the beam portion 36. The solder 50 is melted in this way, so that the optical fiber 10 is soldered to the bonding pad 33 in the same manner as the first embodiment.

According to the method of manufacturing the optical module 5 using the fiber mount device 8 of this embodiment, the conduction of heat, which is generated in the laser absorption layer 32, to the base 20 in a short circuit manner is prevented by the space. Accordingly, it is possible to more efficiently conduct this heat to the bonding pad 33 through the beam portion 36 and the pillar portion 37b of the fiber sub-mount main body 31. Furthermore, since the pillar portion 37b is thicker than the beam portion 36, the pillar portion 37b has a large heat capacity and can further store the heat generated in the laser absorption layer 32. Accordingly, it is possible to perform the soldering step so that the thermal gradient of the bonding pad 33 is smaller.

The invention has been described while taking the first to fourth embodiments as examples, but the invention is not limited to these embodiments.

For example, the optical module of the embodiments has been an optical module that emits a laser beam, which is emitted from the semiconductor laser element 92, from the optical fiber 10. However, the invention is not limited thereto, and may be used in an optical module such as a $LiNbO_3$ modulator. In addition, the invention may be used in an optical module that uses a light receiving element instead of the semiconductor laser element 92 to receive light, which is input from the optical fiber 10, by the light receiving element.

Further, in the embodiment, the base 20 and the fiber sub-mount 30 have formed the fiber mount device. However, when the fiber sub-mount 30 can be used alone, the base 20 is omitted and only the fiber sub-mount 30 may form a fiber mount device.

INDUSTRIAL APPLICABILITY

As described above, according to the invention, there are provided a fiber mount device that can realize an optical module having a small variation by a simple structure, and an optical module using the fiber mount device, and a method of manufacturing the optical module.

The invention claimed is:

1. A fiber mount device comprising:
a fiber sub-mount main body that is made of ceramic transmitting a laser beam having a predetermined wavelength;
a bonding pad that is provided on the upper surface of the fiber sub-mount main body; and
a laser absorption layer that is provided on at least a part of a lower surface of the fiber sub-mount main body and absorbs the laser beam having the predetermined wavelength to generate heat,
wherein the upper surface of the fiber sub-mount main body includes an exposed region to receive and transmit the laser beam having the predetermined wavelength into the fiber sub-mount main body.

2. The fiber mount device according to claim 1, wherein the laser absorption layer is provided so as to protrude from the bonding pad in plan view.

3. The fiber mount device according to claim 1, wherein a base is provided on the side of the laser absorption layer opposite to the fiber sub-mount main body.

4. The fiber mount device according to claim 3, wherein a heat insulating member of which the thermal conductivity is lower than the thermal conductivity of the fiber sub-mount main body is provided between the laser absorption layer and the base.

5. The fiber mount device according to claim 3,
wherein the fiber sub-mount main body includes a beam portion that is partitioned from the base by a space,
the bonding pad is provided on the upper surface of the beam portion, and
the laser absorption layer is provided on at least a part of the lower surface of the beam portion.

6. An optical module comprising:
the fiber mount device according to claim 1; and
an optical fiber that is soldered on the bonding pad by heat that is caused by the laser beam having the predetermined wavelength and irradiating the laser absorption layer.

7. A method of manufacturing an optical module, the method comprising:
a preparation step of preparing the fiber mount device according to claim 1 and an optical fiber;
a disposition step of disposing solder and the optical fiber on the bonding pad; and
a soldering step of heating the laser absorption layer by irradiating the laser absorption layer with the laser beam having the predetermined wavelength, and soldering the optical fiber to the bonding pad by heat.

8. An optical module comprising:
the fiber mount device according to claim 2 ; and
an optical fiber that is soldered on the bonding pad by heat that is caused by the laser beam having the predetermined wavelength and irradiating the laser absorption layer.

9. An optical module comprising:
the fiber mount device according to claim 3; and
an optical fiber that is soldered on the bonding pad by heat that is caused by the laser beam having the predetermined wavelength and irradiating the laser absorption layer.

10. An optical module comprising:
the fiber mount device according to claim 4; and
an optical fiber that is soldered on the bonding pad by heat that is caused by the laser beam having the predetermined wavelength and irradiating the laser absorption layer.

11. An optical module comprising:
the fiber mount device according to claim 5; and
an optical fiber that is soldered on the bonding pad by heat that is caused by the laser beam having the predetermined wavelength and irradiating the laser absorption layer.

12. A method of manufacturing an optical module, the method comprising:
a preparation step of preparing the fiber mount device according to claim 2 and an optical fiber;
a disposition step of disposing solder and the optical fiber on the bonding pad; and
a soldering step of heating the laser absorption layer by irradiating the laser absorption layer with the laser beam having the predetermined wavelength, and soldering the optical fiber to the bonding pad by heat.

13. A method of manufacturing an optical module, the method comprising:
a preparation step of preparing the fiber mount device according to claim 3 and an optical fiber;
a disposition step of disposing solder and the optical fiber on the bonding pad; and
a soldering step of heating the laser absorption layer by irradiating the laser absorption layer with the laser beam having the predetermined wavelength, and soldering the optical fiber to the bonding pad by heat.

14. A method of manufacturing an optical module, the method comprising:
a preparation step of preparing the fiber mount device according to claim 4 and an optical fiber;
a disposition step of disposing solder and the optical fiber on the bonding pad; and
a soldering step of heating the laser absorption layer by irradiating the laser absorption layer with the laser beam having the predetermined wavelength, and soldering the optical fiber to the bonding pad by heat.

15. A method of manufacturing an optical module, the method comprising:
a preparation step of preparing the fiber mount device according to claim 5 and an optical fiber;

a disposition step of disposing solder and the optical fiber on the bonding pad; and a soldering step of heating the laser absorption layer by irradiating the laser absorption layer with the laser beam having the predetermined wavelength, and soldering the optical fiber to the bonding pad by heat.

* * * * *